United States Patent Office 3,383,650
Patented May 14, 1968

3,383,650
ECHO SOUNDING APPARATUS FOR RECORDING SONAR ECHOES OF GREATLY VARYING AMPLITUDES
Hans Drenkelfort, Kiel-Elmschenhagen, Germany, assignor to Electroacustic Gesellschaft mit beschrankter Haftung, Kiel, Germany, a corporation of Germany
Filed Jan. 5, 1965, Ser. No. 423,533
Claims priority, application Germany, Jan. 10, 1964, E 26,202
5 Claims. (Cl. 340—3)

My invention relates to echo sounding apparatus operating with audible or supersonic sound waves for detecting and locating underwater objects such as fish or schools of fish. In a more particular aspect, the invention concerns sonar apparatus equipped with a recorder for discernibly indicating echoes of greatly different intensities on electrically sensitive recording paper, preferably for such purposes as recording the weak echoes reflected from fish.

Sonar apparatus of this type are used in the fishing industry for locating schools of fish. This poses the problem, particularly for net fishing along the sea bottom, to detect schools of fish located closely above the bottom. Since the differences in distance of the sonar transducer from the weakly reflecting school and from the strongly reflecting bottom are only slight and are further reduced by the geometry of the sonar beam cone, the two echoes are no longer recorder separately. In addition, electrically sensitive recording papers have an only slight blackening range. The attempts previously made at improving the resolving power of such echo sounding equipment leave much to be desired and have led to various other disadvantages.

Known recording devices for general purposes (U.S. Patent 2,433,382) which are to produce several recording tracks with the aid of a single stylus, have been provided with respectively different series-connected resistors in the electric circuit of the stylus in order to write differently thick tracks. While this affords a clear distinction between the respective recording tracks, similar means, if applied to echo sounding apparatus, would neither respond to extreme differences in echo amplitudes, nor reveal the presence of fish closely above sea bottom.

It is also known to connect a resistor serially into the stylus circuit (British Patent 749,933) and to give this resistor a sufficiently large magnitude to reduce the heat development and resulting consumption of the stylus member. This, however, is accompanied by a greatly increased counter effect of the paper resistance, varying during the writing operation, upon the stylus voltage.

Further known are devices particularly designed for improving the recognizability of recordings indicative of fish near the sea bottom. In these echo sounding devices (U.S. Patent 2,443,647) the receiving amplifier is provided with automatic means for controlling a grid bias voltage. Recordings of nearly constant thickness (gray recordings) are produced for a given voltage range up to a selective upper limit. When the signal voltage is above the limit value, the grid bias voltage automatically increases with a given time delay so that, for example, the echo reflected by the sea bottom is written black only at the first moment, but immediately thereafter is recorded in a shade of gray which is selectively adjustable with the aid of circuit components.

Further known is an amplifier (German Patent 1,013,548) for obtaining differently thick recordings of echoes having respectively different amplitudes no longer recordable by electrically sensitive paper. When the amplitude of the incoming echo exceeds a given intensity, this amplifier translates it into two recording voltages, taken either from two sets of amplifiers or from a single amplifier. During the recording of the echograms, the two voltages are made simultaneously effective either with the same polarity or the opposed polarities. It may then happen that the opposingly poled voltage has too large a compensating effect or that it results in the same gray value as the other voltage. Furthermore, if the input voltage supplied to the amplifier happens to be too large, which may be due to a faulty base adjustment of the amplifying gain, the resulting voltage may swing beyond the zero value and again produce an entirely black recording.

It is also known (British Patent 711,323) to switch between different degrees of amplifying gain in dependence upon the position of a continuously rotating stylus relative to the paper. This device has little adaptability and tends to skip recordings on account of the fact that the echo voltage itself does not control the amplifying gain.

All of the above-mentioned designs and types of sonar amplifiers have a rather large time constant with respect to the desired control of the writing operation, which results in undesirably broad tracks or curves. For example, the echo of the sea bottom surface is written more broadly than corresponds to its geometric location. This reduces the resolving power of the recordings because any indication of schools of fish close to the sea bottom is obscured by the bottom echo as long as such fish echoes remain in the order of magnitude of the recording or track width. Such amplifier designs also involve a relatively long "dead" interval immediately following a controlling operation, in which interval no recordings are possible so that any then arriving echoes do not shown on the echogram.

It is an object of my invention to eliminate or greatly minimize the above-mentioned shortcomings or disadvantages of the known echo sounding apparatus heretofore available.

Another, more specific object of my invention is to provide sonar apparatus in which obstacles or targets, such as fish, located closely above the sea bottom are more distinctly recorded than in the known systems.

Another object of the invention, conjointly with the one just mentioned, is to afford reducing or virtually eliminating the time delay heretofore involved in the intensity control of the sonar recordings, thus permitting the recording of echoes to take place immediately upon the occurrence of such a control operation so that virtually no interruption in recording performance with a resulting loss of signal data is encountered.

Still another object of my invention is to afford adjusting the recording performance of sonar apparatus to respectively different requirements or desiderata of use.

Another object of the invention is to devise equipment for improving sonar recordings in accordance with one or more of the foregoing objects with the aid of equipment readily applicable as a supplement to already existing sonar apparatus.

According to a feature of my invention, I provide an echo sounding apparatus, comprising an electrosonic transducer and a recorder operating with electrically responsive chart paper, in addition to the conventional amplifier, with an electronic control device which, under control by the amplifier, regulates or varies the recording voltage in the forward sense. More specifically, the control device, responding to amplified echo voltages above a threshold value higher than a correlated maximal amplitude of a weak echo, reduces the recording voltage below the value of recording voltage that corresponds to the weak echo. Preferably the reduction in recording or stylus voltage is applied by the electronic control device between the last electronic stage of the amplifier and/or between the last switching or impedance component of the amplifier circuitry and the recording paper. The term "weak" echo denotes an echo intensity, and hence a corresponding echo voltage signal from the transducer which is chosen from within the low-amplitude portion of the total available range of echoes or echo voltages. For example and preferably, the "weak" echo corresponds to that reflected from fish closely above the sea bottom, in contrast to the much stronger echo reflected from the sea bottom. It will be recognized, therefore, that the above-mentioned electronic control device, which forms part of the circuitry between the electrosonic transducer and the echo recorder, operates to reverse the type of recordings in such a manner that weak echoes result in high intensity recordings on the electrically sensitive paper, whereas high intensity echoes result in echo recordings of reduced intensity.

An electronic control device in sonar apparatus according to the invention can readily be given a low-ohmic resistance and need virtually not have a time constant so that the recording may directly follow upon the voltage control. A further consequence of such an anticipating or "forward" voltage control is the possibility of having the recorded tracks or curves written by very fine lines, so that particularly the sea bottom is represented by a thin contour line which thus becomes clearly distinguished from the more heavily written fish echoes. Despite the very large amplitude ratio and the slight blackening range of the electrically sensitive paper, both echo recordings nevertheless appear within the blackening range of the paper so that there still remains some gray or black range for each of these echoes without impairing the clear distinction between them.

Furthermore, electronic voltage control devices on the above-mentioned principle can be readily added either to already existing sonar apparatus, or they may be made exchangeable or selectively switchable into or out of operative connection with the apparatus. Consequently many sonar system already in use can be improved by converting them in accordance with the invention, and new as well as old sonar apparatus can be readily adjusted in accordance with differences or changes in operating requirements. No appreciable modifications inside of the amplifier are necessary, and the voltage control takes place at an electrically less trouble-susceptible locality.

Although it is known as such to provide echo sounding equipment with a forward regulation (British Patent 865,111; German published patent application 1,136,248) by deriving from the incoming echo pulse an opposingly phased pulse having a fixed time spacing from the leading flank of the first pulse which suppresses the recording after occurrence of the leading contour line, this results in losing information at this particular recording locality, aside from the fact that the apparatus not only possesses the already mentioned amplifier time constant, but also adds further time constants due to integrating and differentiating members. The temporary suppression of recordation for a fixed interval of time following the beginning of a recording operation due to receipt of an echo from a large school of fish closely above the sea bottom, may also cause the next following contour line of the sea bottom to remain unrecorded, whereby this school of fish is recorded as a bulge of the bottom and hence may be interpreted as part of the bottom. In addition, apparatus of this kind does not always function satisfactorily. For example, if the sea bottom is soft so that the echo pulse increases only slightly in intensity, the amplitude of the opposingly phased and fixedly delayed voltage is not sufficient to obtain a clearly distinguished contour line.

According to another feature of the invention, the additional electronic voltage control device is so dimensioned that the recording voltage assigned to an echo voltage above the above-mentioned threshold value is reduced down to below, or to only little above, the minimum voltage at which the electrically sensitive paper will respond. This has the advantage that a too strong but not interesting echo is completely suppressed or only slightly visible on the record so as to be fully dominated by the recorded image of actual interest.

According to still another feature of the invention, the above-mentioned voltage control device comprises as its active main component an electronically variable resistor connected parallel to the resistance of the recording paper and controlled by the echo voltage of the sea bottom, and the control of the variable resistor is made dependent upon a threshold value of such magnitude that the weaker echo voltage stemming from fish cannot control the resistor so that the recording voltage relating to fish remains unmodified, whereas the voltage for recording the sea bottom is reduced to below the recording voltage for fish. Such a control device operates in a simple and reliable manner to obtain a clearly distinctive recording of fish even though they may be situated close to the sea bottom. The fish recordings of interest are greatly emphasized in contrast to the bottom recording so that unskilled personnel on fishing vessels can readily recognize the presence of bottom fish. Thus many worthwhile catches, otherwise obscure or hidden, become reliably detectable, and the fisherman may give more attention to the servicing of nautical and fishing equipments.

It is of interest to compare the invention, as briefly described above, with a safety device which has become known in facsimile apparatus (U.S. Patent 2,457,131) for preventing the recording paper from being burned at excessively high voltage amplitudes and also for preventing damage to the tetrode or pentode in the power output stage of the amplifier in the non-recording intervals of facsimile transmission, during which the transmitter and receiver are being synchronized and the screen grids of the power tubes may become overloaded because no plate voltage is applied. This known safety device comprises a voltage-dependent resistor in the anode lead of the above-mentioned electronic tubes in parallel relation to the resistance of the facsimile paper. In the synchronizing intervals or when the stylus is lifted off for exchanging the paper, the resistor keeps the anodes continuously connected with the source of plate voltage to maintain a continuous flow of anode current. The device also prevents burning of the paper during recording operation, for example when the amplifying gain is incorrectly adjusted.

Facsimile transmission, however, does not involve the problem upon which the present invention is predicated, namely to distinctively record objects so close to each other that normally they can no longer be recorded distinctively on account of the small blackening range of electrically sensitive paper. Furthermore, in facsimile transmission, the object itself is accessible and controllable, since the originals to be transmitted may be produced or selected for a proper blackening range, for example by using photographic enlargement paper having a corresponding graduation and/or by correspondingly controlling the photographic developing process. In echo sounding operations, however, the reflecting objects, such as fish and the sea bottom, are not controllable so that resort can be taken only to means and expedients embodied in the sonar apparatus itself. This has led to the initially described types of known sonar equipment involving the shortcomings and disadvantages already discussed.

The characteristic differentiation between echo signals, afforded by the invention, is not possible with equipment according to the above-mentioned U.S. patent on facsimile equipment (2,457,131). For example, a voltage-dependent resistor alone does not permit a reversal in the degree of blackening, or the recording of any very high voltage amplitudes in a still unsaturated blackening range below that assigned to given lower voltage amplitudes.

According to a further feature of the invention, a sonar apparatus otherwise as described above is provided with a plurality of electronically variable resistors having respectively different threshold values and/or control characteristics. This permits distinctively recording a greater variety of objects in spite of a large amplitude range of the echo intensities and echo voltages of the respective objects and despite the limited blackening range of the electrically responsive recording paper.

The invention will be further described with reference to embodiments of echo sounding apparatus according to the invention illustrated by way of example in the accompanying drawings, in which.

Figure 1:
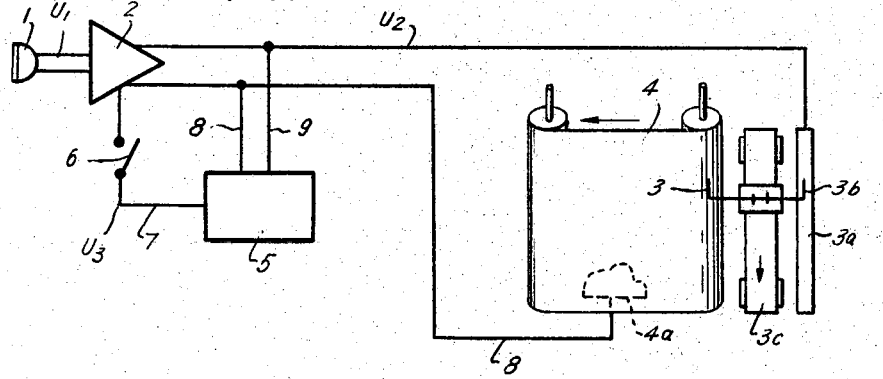
FIG. 1 is a schematic block diagram of an echo sounding apparatus.
Figure 6:
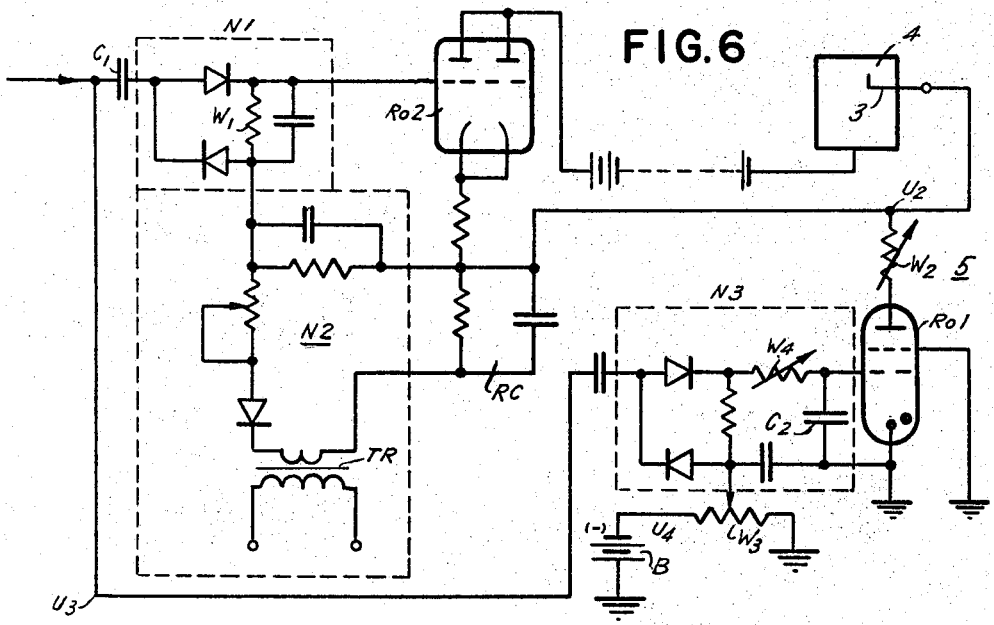

FIG. 6 exemplifies a circuit diagram of an electronic voltage control device applicable in a system according to FIG. 1, showing the output stage of an amplifier and an electronically controllable resistor parallel to the resistance of the recording paper.

Figure 7:
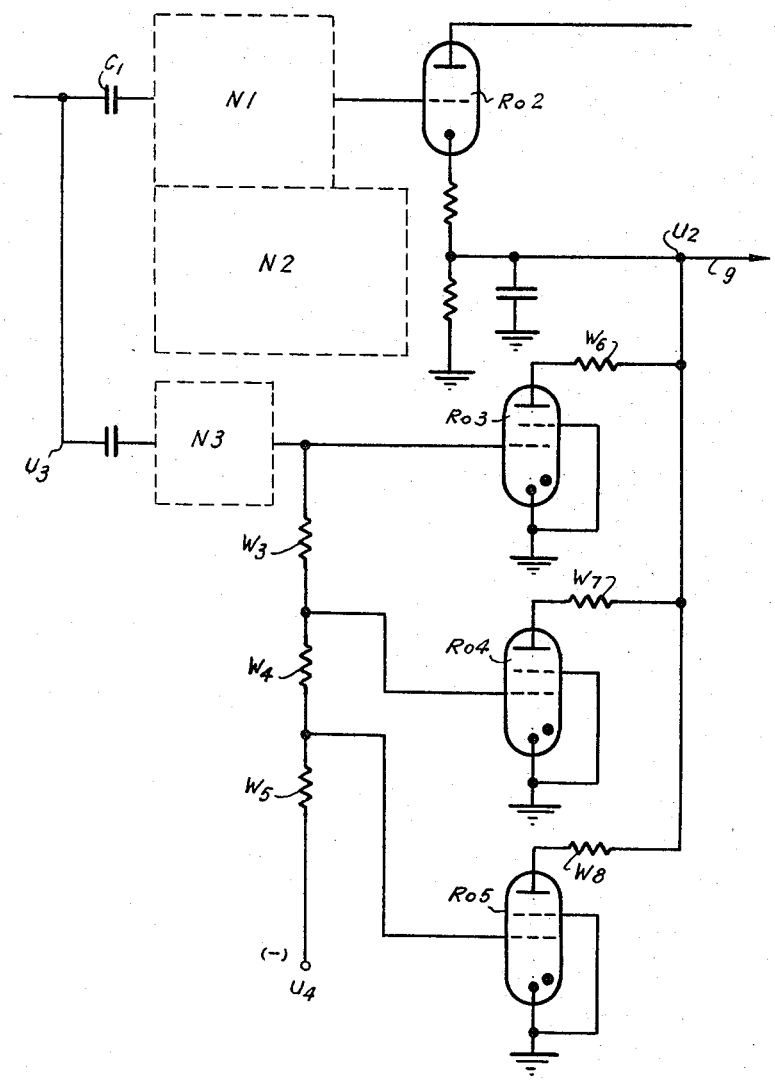

FIG. 7 shows a circuit diagram similar to that of FIG. 6 but comprising a plurality of electronically controlled resistors in parallel relation to the resistance of the recording paper.

Figure 8:
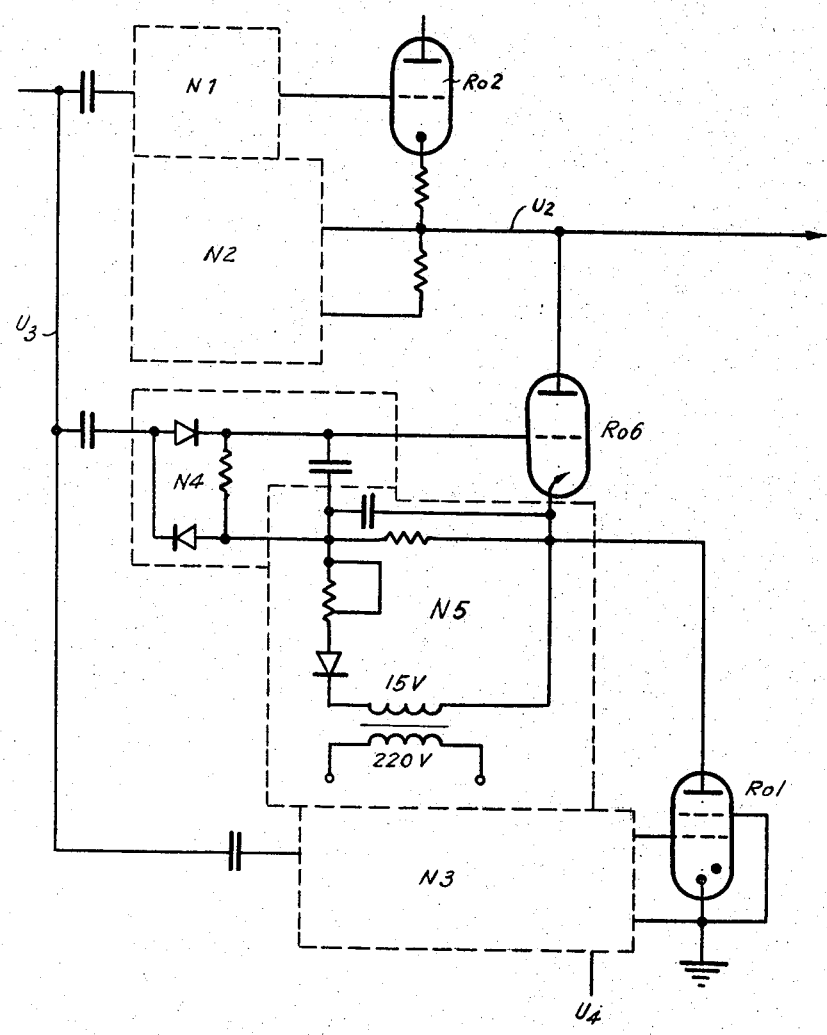

FIG. 8 shows another example of a circuit diagram generally similar to that of FIGS. 6 and 7 but having a relay tube connected with a continuously controllable other tube operating as an anode resistor.

Figure 9:
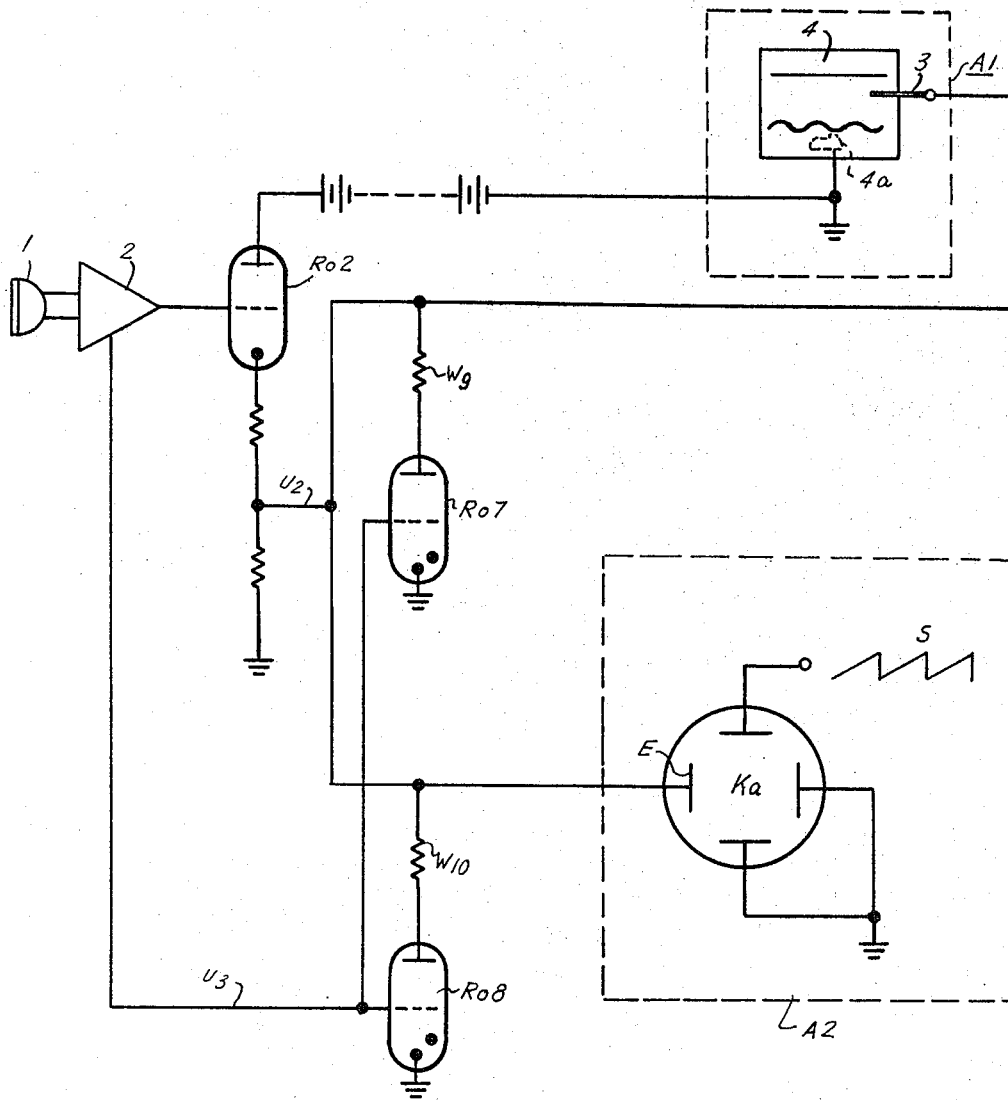

FIG. 9 shows schematically a circuit diagram relating to the amplifier output stage of an echo sounding apparatus equipped with a chart recorder and a cathode-ray indicator tube.

According to FIG. 1, the transducer of the illustrated sonar apparatus converts the received echo signals into an echo voltage $U_1$ which is amplified in an amplifier 2. The amplified recording voltage $U_2$ is supplied to a recorder whose stylus 3 passes periodically over a strip of electrically sensitive paper 4 while the paper travels in the direction of the indicated arrow in contact with a fixed surface electrode 4a contacting the conductively coated rear side of the travelling paper. The recording voltage $U_2$ is thus effective between the stylus tip and the rear side of the paper to cause blackening of the front side at the travelling tip.

An electronic control device 5 is connected by leads 8 and 9 in parallel relation to the recorder components 3 and 4a, and hence in parallel to the electrical resistance of the recording paper 4. A switch 6 permits switching the electronic control device 5 into and out of operative condition. The leads denoted by 7, 8 and 9 are preferably provided with plug connectors (not illustrated) to facilitate exchanging the control device 5.

The recording voltage $U_2$ is impressed upon the stylus 3 through a contact rail or bus bar 3a which is contacted by a contact spring 3b conductively connected with the stylus and travelling together therewith. The stylus assembly is fastened on an endless belt 3c which moves the stylus at constant speed across the recording paper 4 in synchronism with the sequence of the sonar signals transmitted into the water. The paper 4 is transported at constant speed in the direction of the arrow. Further details of the recorder are not illustrated and described herein, because recorders of this type are known as such, for example from U.S. Patents 2,946,647 and 3,076,173.

Simultaneously with the recording operation described, the echo voltage $U_1$, or a proportional control voltage $U_3$ derived from voltage $U_1$ through the amplifier 2, imposes upon the recording voltage $U_2$ a control in the forward or anticipating sense. This control is so adjusted that the control voltage $U_3$ stemming from the echo voltage will reduce the recording voltage $U_2$ only when the echo voltage or the corresponding control voltage $U_3$ exceeds a given threshold value. As will be shown by the examples described hereinafter, there are various ways of providing for this type of control. First however, the advantages of such a negative feed-forward control will be explained with reference to examples of echograms.

Figure 2:
FIGS. 2 and 4 show schematic and greatly enlarged echograms resulting from a school of fish and a bottom contour line as recorded in known sonar equipment.

FIG. 2 shows greatly enlarged an echogram as obtained with echo sounding apparatus in which the amplifying gain is feedback-controlled in the previously known manner. The echogram relates to a school of fish closely above the sea bottom. It is apparent that an intensive bottom echo B may be written in a gray shade for distinction from the fish echo. However, in these known devices the commencement of the writing operation is delayed by the properties of the amplifier. That is, the amplifier must contain coupling members which involve time constants so that the echo modulation to be recorded will not be lost. This modulation, in conjunction with the inherent resistance of the control-voltage source has the effect of flattening the control voltage which initiates the regulation of the writing performance, with the result that a relatively long interval of time is lost until the regulation commences to be effective. The time constants due to the operating principle of the amplifier, are prolonged by oscillating circuits of the amplifier which, upon initiation of the regulation, require a certain length of time for decay of the oscillation. As a consequence of these time constants or delays, the bottom is recorded by a broad contour line K and the fish echo manifests itself only as a widened portion $F_1$ of this contour line. Compared with the total width of the bottom contour, the widening is rather slight. Since the eye predominantly responds to relative changes or differences, the echo from a school of fish located closely above the bottom is not well discernible and may be easily overlooked or mistaken for an irregularity of the sea bottom.

Figure 3:
FIGS. 3 and 5 show schematic and greatly enlarged echograms as obtained with sonar apparatus according to the invention under the same sounding conditions as those underlying the recordings shown in FIGS. 2 and 4 respectively.

In sonar apparatus according to the invention, however, such feedback effects of the amplifier upon the time required until the regulation of the recording operation becomes effective, is eliminated. Therefore, as shown in FIG. 3, the contour line K of the bottom B is written considerably narrower so that the relative change of the broadening effected by the fish echo $F_1$ is comparatively much larger and thus more conspicuous. In many cases this makes a school of fish detectable which otherwise may not be recognized at all.

Figure 4:
Figure 5:

The echogram shown in FIG. 4 relates to a result obtained with the known sonar equipment when the amplifying gain is set too high so that fish echoes are likewise appreciably subjected to the control of the recording operation. In the known sonar equipment with feedback regulation, relatively dense schools of fish $F_2$ cannot be separated from the contour line K of the bottom in this manner because the appreciable time constant of the feedback regulation does not permit reducing the recording voltage to a sufficiently low value after the bottom echo ceases and the fish echo commences. In apparatus according to the invention, however, and as schematically shown in FIG. 5, the fish echo $F_2$ can be recorded in clear separation from the contour line K of the bottom echo B.

It will be recognized that the adjustment of an otherwise excessive amplifying gain in apparatus according to the invention need not be detrimental but may be utilized to considerable advantage. It is, therefore, preferable according to the invention to adjust the threshold value and amplifying gain to such magnitudes that some fish echo voltages will appear above the threshold value and are thus also subjected to the negative feed-forward regulation of the recording voltage. In this manner, and as apparent from the example of FIG. 5, relatively intensive fish echoes are still separated in the recorded echogram from the bottom echo, even if the two echoes follow one another in virtually direct succession. Such a resolution is not possible with the known sonar equipment and cannot be achieved with the aid of a voltage-responsive resistor as employed for facsimile techniques (according to the above-mentioned U.S. Patent 2,457,131).

FIG. 6 shows in detail an embodiment of the voltage control device 5 (FIG. 1) of the sonar apparatus. In this device, the additional electronically variable resistor is constituted by a gas-filled relay of switching tube $Ro1$ whose plate circuit is connected parallel to the paper resistance of the recorder. The recording voltage $U_2$ is applied to the anode of tube $Ro1$. The control voltage $U_3$ coming from the amplifier is applied to the control grid. Such an electronic tube circuit affords an effective and rapid variation of the recording voltage in the desired sense. A grid bias voltage $U_4$ provides for a threshold value which is adjustable by means of a potentiometric resistor $W_3$. As a rule, the threshold value is set somewhat above the range of the fish echo voltages, so that the tube $Ro1$ is virtually ineffective and may be disregarded with respect to the recording of fish echoes. However, when the control voltage $U_3$ from the amplifier exceeds the threshold value, due to reception of a high-intensity echo from the seat bottom, then the relay tube $Ro1$ is fired and virtually short-circuits the recording voltage $U_2$. The high recording voltage of the bottom echo is thus completely kept away from the recording paper, and overpowering of the weak fish echoes is thus avoided. Consequently, the amplifying gain may be adjusted to a very high value so that an optimal recording sensitivity is attained with respect to the weak fish echoes of interest.

Often, however, an additional recording of the bottom echo is also desired. The illustrated control device is, therefore, provided with an additional anode resistor $W_2$. This resistor is so adjusted that intensive echoes, which cause firing of the tube $Ro1$ are written in a desired gray shade adjustable by means of the resistor $W_2$.

The gray-shade graduation is adjustable within very wide limits. For example, the recording voltage may be reduced to such an extent that there remains only a recording voltage $U_2$ slightly above the minimum at which the electrically sensitive paper will respond. The result is a weak gray shade for the bottom echo, whereas the fish echo, not affected by the gray adjustment, is written in a considerably darker or deep-black shade, thus forming a conspicous contrast to the recorded bottom echo.

If desired, the gray value of the bottom recording may also be adjusted to a darker shade, so that together with an adjustment of the amplifying gain, each desired gray-graduation between fish and bottom echoes is adjustable. This affords an adaptation to the particular sounding conditions, as well as to the visibility conditions on the bridge of the fishing boat.

The tube $Ro2$ in FIG. 6 is connected in the power output or end stage of the amplifier 2 (FIG. 1). The network N1 shown in FIG. 6 is a voltage doubling circuit. The network N2 serves to provide a grid bias voltage and is shown, by way of example, to comprise a transformer TR whose primary winding is to be connected to a 110 v. or 220 v. alternating-current supply and whose secondary winding furnishes an A-C voltage of 15 v. which is smoothed by an RC member. Any other grid-bias source, such as a battery B with a series rheostat $W_3$ as shown for tube $Ro1$, may also be used. The networks N1 and N2 do not form part of the present invention proper but are conventional components. The network N3 is a two-way rectifier circuit which is optional rather than necessarily required for performing the essential voltage control function required for the purpose of the invention. This applies also to the resistor $W_4$ and the capacitor $C_2$ shown in FIG. 6. These latter components introduce an adjustable time constant which permits writing a bottom contour line of adjustable width. This adjustable time constant may be reduced to zero so that the bottom echo may be written without any contour line K. In the latter case, the bottom echo B in totality is written in gray, relative to which the fish echo is conspicuously recorded in black.

The modified voltage control device shown in FIG. 7 is similar to that of FIG. 6, the tube denoted by $Ro$ in FIG. 7 being also the same end-stage tube of the amplifier 2 (FIG. 1). The device of FIG. 7, however, is provided with several electronically variable resistors having preferably different threshold values respectively. These resistors comprise three relay tubes $Ro3$, $Ro4$, and $Ro5$ whose respective anodes are connected through resistors $W_6$, $W_7$ and $W_8$ to the recording voltage $U_2$. The grids of the three tubes are all controlled by the above-mentioned control voltage $U_3$ derived from the amplifier. If desired, however, several and preferably different control voltages may be used for this purpose. A voltage divider composed of resistors $W_3$, $W_4$ and $W_5$ is impressed by bias voltage $U_4$ and has respective taps connected with the control grids of the respective tubes $Ro3$ to $Ro5$ for assigning to them respectively different threshold values.

The voltage control device according to FIG. 7 thus provides different threshold values which cause the control device to respond at respectively different operating conditions, so that optimal apparatus adjustments may be provided and faulty adjustments due to inattentive or unskilled servicing cause no appreciable detriments. Interesting fish echoes cannot be lost. The anode resistors $W_6$ to $W_8$, which preferably have respectively different ohmic values or of which one or the other may be omitted, afford utilizing a graduated blackening or gray range of the recording paper. For example, details of the bottom echo and of the fish echo may be thus differently recorded.

The voltage control device shown in FIG. 8 is likewise similar to that of FIG. 6, the essential difference being that the anode resistor $W_2$ (FIG. 6) is replaced by an electronic tube $Ro6$. Its internal resistance is controllable within wide limits and in a variety of ways. The control of tube $Ro6$ may be effected by a separate control voltage impressed upon the grid of this tube, as well as by the same control voltage $U_3$ which is derived from the amplifier and controls the relay tube $Ro1$. For example, when the control voltage $U_3$ exceeds the threshold value determined by the grid bias voltage $U_4$, the tube $Ro1$ fires and the blackening of the recording paper then takes place in additional dependence upon the internal resistance of the tube $Ro6$.

In the embodiment of FIG. 8, the internal resistance of the tube $Ro6$ and consequently the blackening intensity of the recording paper decreases with increasing control voltage $U_3$. Consequently the blackening of the paper increases with the echo voltage up to attainment of the threshold value and thereafter decreases when the threshold value is exceeded. This affords utilizing the graduation scope of the paper twice, thereby virtually doubling the range of recordable information.

Denoted by N4 in FIG. 8 is a network which rectifies and doubles the control voltage $U_3$ derived from the echo voltage, corresponding in this respect to the above-mentioned networks N1 and N3. Network N5 produces a fixed but adjustable grid bias voltage for tube $Ro6$, corresponding to the network N2 and its relation to the tube $Ro2$.

The modification shown in FIG. 9 is applicable with any of the voltage control devices shown in FIGS. 6 to 8 and relates to the use of a cathode-ray picture tube in conjunction with the above-mentioned chart recorder, such conjoint use of different indicating instruments being known as such, for example from Patents 2,788,509 and 3,076,173. In FIG. 9 the chart recorder is schematically shown at A1 and the picture tube at A2. Both receive voltage from the output stage of the amplifier of which only the tube R$o$2, corresponding to the equally designated tube in FIGS. 6, 7 or 8 is shown. Denoted by R$o$7 is a relay tube whose anode is connected in series with a resistor W$_9$ for controlling the recording voltage applied to the chart recorder A1 in the manner described above with reference to FIG. 6, for example. Another, similar electronic voltage control device is connected parallel to the subsidiary indicator A2. This device, in the illustrated embodiment, is connected parallel to the pair of horizontal deflection electrodes E of a cathode-ray tube K$a$, this electrode pair also receiving the above-mentioned recording voltage U$_2$. The pair of vertical deflection electrodes is supplied with a saw-tooth voltage S which deflects the cathode ray periodically in the downward direction in synchronism with the issuance of the sonar signals. The occurrence of an echo-responsive indication on the picture screen indicates the depth of the reflecting object, this depth being proportional to the downward travel time of the cathode-ray spot. The indication of echoes thus takes place in a horizontal direction at a locality of the picture screen corresponding to the distance of the reflecting object. The additional electronic voltage control device operates to vary the amplitude of the horizontal cathode-ray deflection by feed-forward control in the same manner as the above-described blackening of the electrically sensitive paper in the chart recorder.

If desired, the two electronic voltage control devices may be given respectively different designs to suit a variety of different purposes. For example, the two control devices may be set for respectively different threshold values; or the anode resistors W$_9$ and W$_{10}$ may be given respectively different ohmic resistances, and the electronic components may be of respectively different types. This affords increasing the total amount of information made available by the entire echo sounding equipment. For example, one of the indicating apparatus, such as the chart recorder, may serve mainly one preferred purpose of indication, whereas the other indicator, such as the picture tube, may simultaneously afford a preferential indication of other matters. Thus one of the two indicating instruments is available for a survey over a relatively large area, whereas the other affords a detailed indication of partial sounding range selected from within the large area.

To those skilled in the art, it will be obvious upon a study of this disclosure that my invention permits of various modifications, such as the use of switching transistors, thyristors or other semiconductor devices instead of tubes, and hence may be given a variety of embodiments other than those particularly illustrated and described herein, without departing from the essential features of my invention and within the scope of the claims annexed hereto.

I claim:

1. Sonar apparatus, comprising a transducer for translating received sonic echoes to echo voltage, a recorder for producing echograms on electrically sensitive recording paper, each of said echograms comprising a plurality of spaced substantially parallel lines each representing one recording cycle of said recorder and each including a contour portion of determined length representing the bottom of a body of water and an additional portion representing floating objects in the body of water, and an amplifier connecting said transducer to said recorder for applying recording voltage to the paper in response to said echo voltage, an electronic voltage control device connected between said amplifier and said recorder and having a plurality of electronically variable resistance means connected in parallel relation to the paper resistance of said recorder, said resistance means having respective input means connected to said amplifier for response to the echo voltage and each of said resistance means having one voltage threshold value corresponding to a given echo amplitude in the low-amplitude portion of the total receivable amplitude range, each of the threshold values being different from the others, so as to reduce by one of said resistance means, when said echo voltage is above the threshold value of said one of said resistance means, the recording voltage to below the one obtaining at said given echo amplitude thereby considerably shortening the determined length of the contour portion of each line of said echogram to considerably increase the ratio of the length of the additional portion of each said line to said determined length of each said line so that a considerably greater contrast is provided between said additional and contour portions and therefore between said floating object representations and said bottom representations.

2. In sonar apparatus according to claim 1, said resistance means comprising ohmic resistors of respectively different resistance value individually series-connected with a plurality of electronically controllable relay means respectively.

3. Sonar apparatus, comprising a transducer for translating received sonic echoes to echo voltage, a recorder for producing echograms on electrically sensitive recording paper, each of said echograms comprising a plurality of spaced substantially parallel lines each representing one recording cycle of said recorder and each including a contour portion of determined length representing the bottom of a body of water and an additional portion representing floating objects in the body of water, and an amplifier connecting said transducer to said recorder for applying recording voltage to the paper in response to said echo voltage, an electronic voltage control device having electronic switch means having a main circuit connected parallel to said recorder and having a switch control circuit connected to said amplifier for response to said echo voltage, and bias voltage means for providing said switch means with a voltage threshold corresponding to a given echo amplitude in the low-amplitude portion of the total receivable amplitude range, and a variable resistance member series-connected in said main circuit and having a resistance control circuit connected to said amplifier for response to said echo voltage, whereby said switching means and said resistance member reduce the recording voltage to below the one obtaining at said given echo amplitude when said echo voltage is above said threshold value thereby considerably shortening the determined length of the contour portion of each line of said echogram to considerably increase the ratio of the length of the additional portion of each said line to said determined length of each said line so that a considerably greater contrast is provided between said additional and contour portions and therefore between said floating object representations and said bottom representations.

4. Sonar apparatus, comprising a transducer for translating received sonic echoes to echo voltage, a recorder for producing echograms on electrically sensitive recording paper, each of said echograms comprising a plurality of spaced substantially parallel lines each representing one recording cycle of said recorder and each including a contour portion of determined length representing the bottom of a body of water and an additional portion representing floating objects in the body of water, and an amplifier connecting said transducer to said recorder for applying recording voltage to the paper in response to said echo voltage, an electronic voltage control device connected between said amplifier and said recorder and having an electronic switching tube, said tube having a plate circuit connected parallel to said recorder and having a control grid circuit connected to said amplifier for response to said echo voltage, an electronically variable anode resistance member series-connected in said plate circuit, and bias voltage means connected with said grid circuit and providing for said tube a voltage threshold corresponding to a given echo amplitude in the low-amplitude portion of the total receivable amplitude range, so as to reduce, when said echo voltage is above said threshold value, the recording voltage to below the one obtaining at said given echo amplitude thereby considerably shortening the determined length of the contour portion of each line of said echogram to considerably increase the ratio of the length of the additional portion of each said line to said determined length of each said line so that a considerably greater contrast is provided between said additional and contour portions and therefore between said floating object representations and said bottom representations.

5. Sonar apparatus, comprising a transducer for translating received sonic echoes to echo voltage, a recorder for producing echograms on electrically sensitive recording paper, each of said echograms comprising a plurality of spaced substantially parallel lines each representing one recording cycle of said recorder and each including a contour portion of determined length representing the bottom of a body of water and an additional portion representing floating objects in the body of water, and an amplifier connecting said transducer to said recorder for applying recording voltage to the paper in response to said echo voltage, an electronic voltage control device connected between said amplifier and said recorder and having an electronic switching tube, said tube having a plate circuit connected parallel to said recorder and having a control grid circuit connected to said amplifier for response to said echo voltage, an electronic variable resistance tube series-connected in said plate circuit and having a grid circuit connected to said amplifier for response to said echo voltage whereby said two tubes are both controlled from said amplifier, and bias voltage means connected with said control grid circuit and providing for said switching tube a voltage threshold corresponding to a given echo amplitude in the low-amplitude portion of the total receivable amplitude range, so as to reduce, when said echo voltage is above said threshold value, the recording voltage to below the one obtaining at said given echo amplitude thereby considerably shortening the determined length of the contour portion of each line of said echogram to considerably increase the ratio of the length of the additional portion of each said line to said determined length of each said line so that a considerably greater contrast is provided between said additional and contour portions and therefore between said floating object representations and said bottom representations.

References Cited

UNITED STATES PATENTS

| | | | |
|---|---|---|---|
| 2,639,209 | 5/1953 | Gamarekian | 346—33 |
| 2,925,580 | 2/1960 | Schumacher | 340—3 |
| 3,013,246 | 12/1961 | Bolzmann | 340—3 |
| 3,072,882 | 1/1963 | Beebe | 340—3 |
| 3,098,210 | 7/1963 | Sparling et al. | 340—3 |

FOREIGN PATENTS 812,638   4/1959   Great Britain.

OTHER REFERENCES

Fahrentholz, German printed application, No. 1,042,438, pub. Oct. 30, 1958.

RICHARD A. FARLEY, *Primary Examiner.*

CHESTER L. JUSTUS, RODNEY D. BENNETT,
*Examiners.*